Nov. 11, 1952  E. MULLEN  2,617,898
ELECTRICAL POWER COLLECTOR ASSEMBLY
Filed Oct. 7, 1946  2 SHEETS—SHEET 2

INVENTOR.
EDWARD MULLEN
BY Joseph Harley

Patented Nov. 11, 1952

2,617,898

UNITED STATES PATENT OFFICE 2,617,898

ELECTRICAL POWER COLLECTOR ASSEMBLY

Edward Mullen, Detroit, Mich., assignor to Mechanical Handling Systems Inc., Detroit, Mich., a corporation of Michigan Application October 7, 1946, Serial No. 701,687

3 Claims. (Cl. 191—49)

This invention relates to an electrical power collector assembly and more particularly to an assembly adapted to be mounted on a trolley bracket for use in an electrified overhead trolley conveyor system.

There are numerous industrial requirements for electrical power supplied along an overhead conveyor track, for example, in the operation of self-propelled electrically powered conveyor units, or in operating the electrical appliances of loads carried along a conveyor track, etc. In order to furnish this power supply, one or more power conductors are usually mounted above and in fixed relation to the conveyor track and power collecting means are provided on the conveyor trolley assemblies for continuously contacting the power conductors as the trolleys and loads move along the conveyor track.

The principal problem in providing an effective collecting means is that of maintaining proper contacting pressure at all times between the collector shoe or wheel and the conducting member mounted along the conveyor track. Due to irregularities in the relative lateral position of the trolley assemblies and the power conducting members arising from curves in the conveyor track, tolerances in manufacture and assembly of the respective parts, side shifting of the trolleys relative to the conveyor track and numerous other causes, it is usually imperative that some resilient means be used to urge the collector into effective contact with the conducting member in a manner which will cause the collector to be operative over a substantial lateral range of positions. This is sometimes accomplished through the spring loading of the collector shoe in a fixed bracket attached to the trolley assembly. However, in order to maintain uniform contact pressure at all times such as to assure good conductivity without excessive wear, it is desirable to provide means that will permit a considerable lateral movement of the collecting member relative to the trolley assembly while at the same time maintaining a constant contact pressure.

It is the principal object of the present invention to provide a power collector assembly adapted to be mounted on a trolley assembly including means for maintaining a substantially uniform pressure throughout side variations in the relative lateral position of the conducting member and the trolley assembly.

Another object is to provide a collector bracket which may be assembled with the trolley in a manner providing for articulation therebetween with resilient means for urging rotation of the bracket in a direction for establishing contact between collecting and conducting members.

A further object is to provide coiled spring means having extensions adapted to react respectively against a portion of the trolley assembly and the collector bracket in a manner such as to provide substantially uniform pressure against the collector bracket throughout a relatively wide arcuate travel of such member.

Another object is to provide for relative lateral movement between the collecting member and trolley assembly in a manner which will be free from any tendency to jam or stick in a fixed position.

A further object is to provide a collector assembly which will protect the lead line running to the collecting member as well as to hold it firmly in a position which will prevent accidental contact with passing objects.

Another object is to provide a collector assembly which will meet the requirements outlined above with a construction which is simple and economical of manufacture and assembly.

These and other objects will appear more clearly from the following detailed description of a particular embodiment of my invention and by reference to the drawings forming a part hereof, wherein Fig. 1 is an end elevation of the collector assembly mounted on a trolley bracket and showing in section the conveyor track as well as a group of conducting members mounted along the track.

Figure 1:
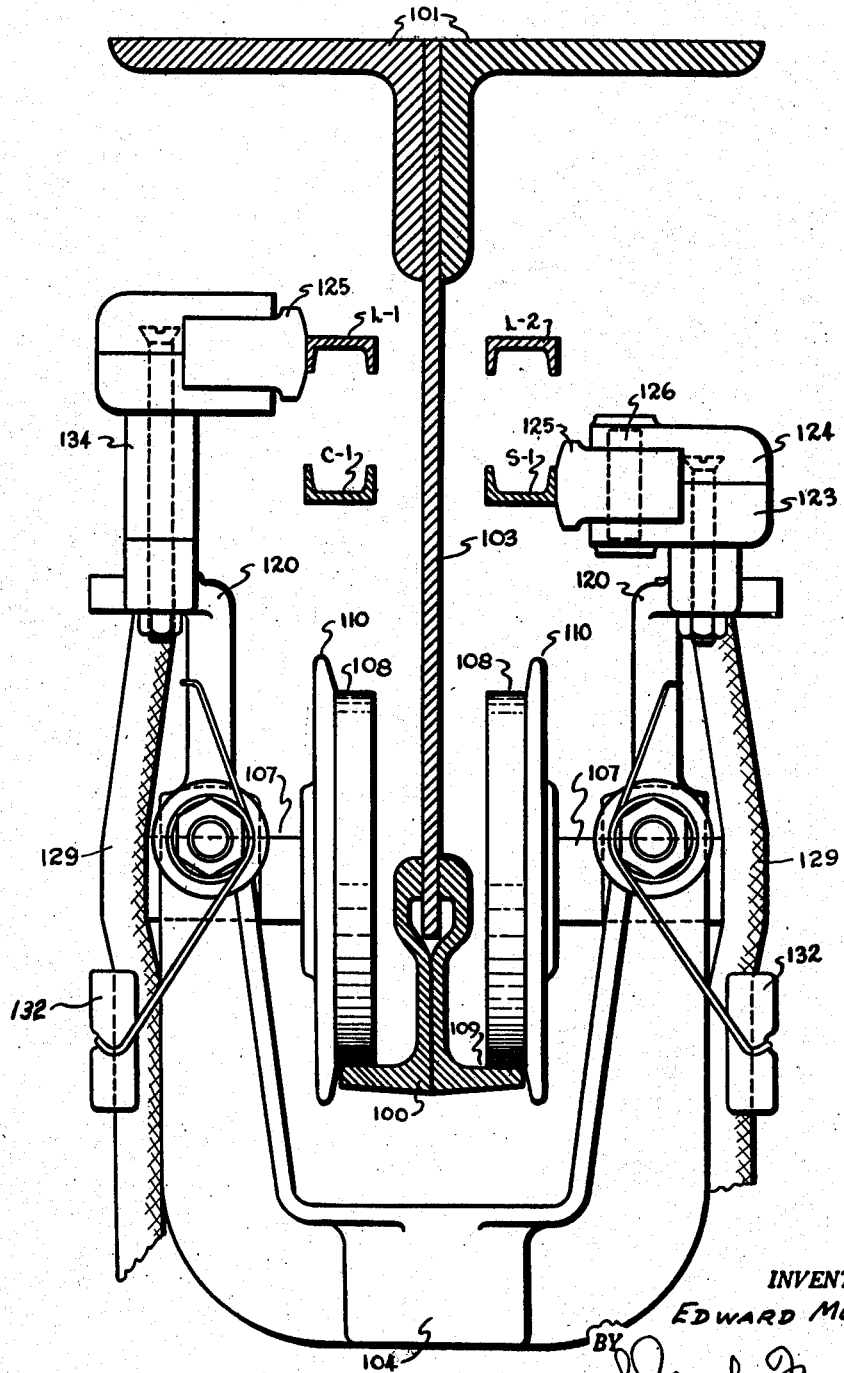
Figure 3:
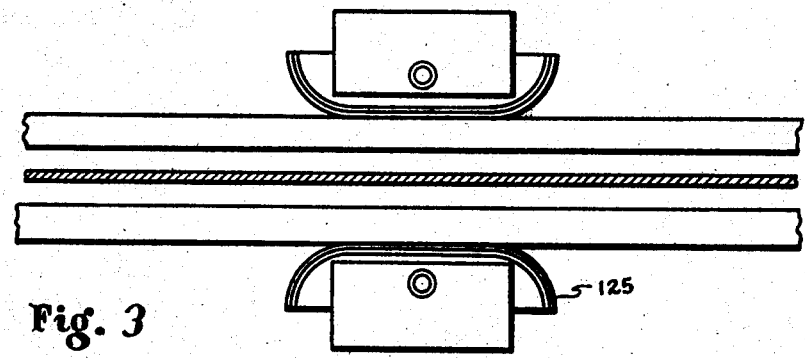
Fig. 3 is a plan view of the collector shoes shown in Figs. 1 and 2 in contact with their respective conductor bars.
Figure 2:
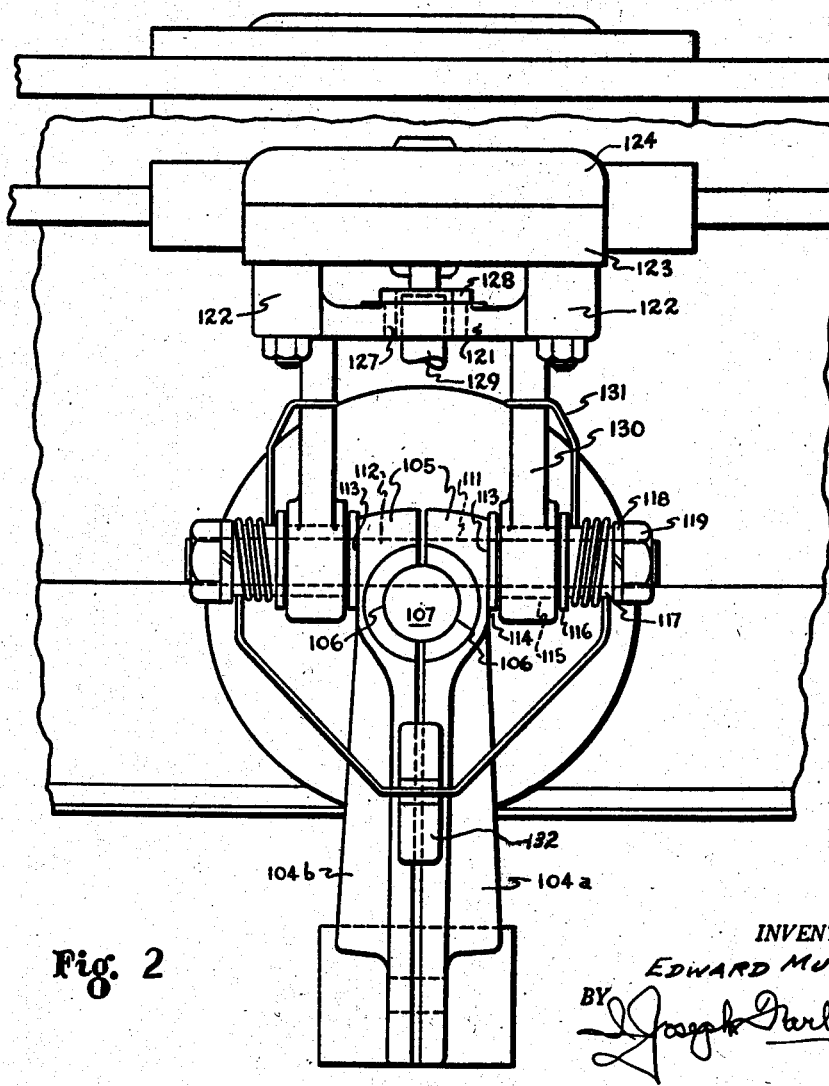
Fig. 2 is a side elevation of the members shown in Fig. 1.

With reference to Fig. 1, a conveyor track 100 is suspended from girder rails 101 by a vertical plate 103. A trolley bracket 104 formed in two transversely spaced halves 104a and 104b, as shown in Fig. 2, has two upper ends 105, each of which is provided with a semi-cylindrical surface 106. When assembled together in opposed relationship, such semi-cylindrical surfaces form the seat for two cylindrical shafts 107 on the inner end of which the inner race of a ball bearing type trolley wheel 108 is attached. The trolley wheels 108 ride on the upper surface 109 of the conveyor track 100 and each of the wheels 108 is provided with a flange 110 to keep the wheels in centered running position on the track.

Parallel to the direction of travel and on an axis somewhat above the axis of the trolley wheel shaft 107, a cylindrical bore 111 is provided through the upper ends 105 of the bracket member. A shaft 112 seated in the bore 111 extends through the upper ends 105 of the bracket member on either side. A notch in the trolley wheel shaft 107 provides clearance for the shaft 112 and permits such latter shaft to act as a key locking the shaft 107 against rotation.

Assembled on each extension of the shaft 112, which is threaded at each of its outer ends, are the following members starting outwardly from the edges 113 of the upper end 105 of the bracket member: a washer 114, a spacer tube 115, a washer 116, a second spacer tube 117, a lock washer 118 and nut 119. Rotatably mounted on the first spacer tubes 115 are the arms 130 of a bracket member which connect at their upper ends 120 to a longitudinal portion 121 of such bracket member. Secured to the outer ends 122 of the longitudinal extension 121 of the bracket member are a lower insulator 123 and upper insulator 124, a collector shoe 125 being secured between the insulators 123 and 124 by means of a hinge pin 126. Located centrally in the longitudinal extension 121 is a cylindrical recess 127 which forms the housing for a tubular insulator 128 through which an insulated lead wire 129 may pass. Such lead wire is connected at its upper end to a hinge pin 126 in a manner establishing a circuit with the collector shoe 125.

A single spring wire 131 is formed to seat against the arms 130, coil around the spacer tubes 117 and bear against a block member 132. Such spring is mounted under torsion such as will urge the arms 130 of the bracket member inwardly causing the collector shoes 125 to bear against the conductor bars S1 and L1 as shown in Fig. 1 which are connected to the vertical plate 103 by insulating means not shown. Each block 132 is provided with a vertically extending groove enabling it to seat on the lead wire 129 which extends downward between such block and the bracket member 104, thus protecting such lead wire from the cutting action of the spring wire 131 while permitting the spring to hold the lead wire firmly against the bracket member 104 in reacting against the same. In order to provide vertical spacing necessary to permit the collector shoe 125 to ride against an upper bar such as L1 or L2, a tubular spacer 134 may be interposed between the outer ends 122 of the collector bracket member and the insulator 123.

It may be seen that with this construction, the tubular members 115 provide clearance between the washers 114 and 116 sufficient to prevent any frictional side resistance to the free articulation of the bracket arms 130 which are held in a central position between such washers by the ends of the spring wire 131 engaged therewith. The vertical spacing between the collector shoe 125 and the shaft 112 provides a radius of articulation of such length as to permit a relatively wide lateral movement of the collector shoe with a relatively small angular movement of the bracket arms 130. This construction together with the coil spring having a number of convolutions of turn around the shaft 112 makes it possible to maintain a substantially uniform pressure throughout such wide lateral movement. The lower portion of the spring 131 serves a double function in holding the lead wire 129 as well as in reacting against the bracket 104. The nuts 119 acting through the various washers and spacer tubes serve to lock the two bracket halves 104a, 104b in position against the wheel shaft 107 as well as to hold the various parts of the power collector in assembled relationship.

While a particular embodiment of the present invention has been described in detail above, it will be readily understood that numerous modifications could be made without departing from the scope of the invention as set forth in the appended claims.

I claim:

1. A power collector assembly for use in an electrified trolley conveyor system of the type wherein trolleys are adapted to travel along a conveyor track and one or more electrical power conducting members are located parallel to said conveyor track comprising a longitudinally extending shaft attached to one of said trolleys, a collector bracket mounted for articulation about the axis of said shaft, a collecting member attached by suitable means to said bracket and positioned to contact one of said conducting members, a spring coiled around said shaft having an extending portion adapted to engage and react against said bracket, a lead wire extending along the side of said trolley, and an extending portion of said spring adapted to hold said lead wire firmly against the side of said trolley and simultaneously thereby react against said trolley.

2. In an electrified conveyor system of the type wherein a conveyor track is suspended from a structural member, load carrying conveyor brackets having upper ends forming a yoke are provided with opposed trolley wheels extending inwardly to run along on the upper surface of said conveyor track, and a plurality of parallel electrical conducting members are adjoined to said conveyor track above the upper ends of said conveyor bracket; a power collector assembly attached to the upper end of either side of said yoke comprising a collector shoe positioned to contact one of said conducting members, insulating members for holding said collector shoe, a collector bracket member for mounting said insulating members, a shaft extending longitudinally through an upper end of said yoke, said collector bracket member being articulately journaled on said shaft, and a spring member for urging said collector bracket inwardly whereby said collector shoe is held in continuous engagement with said conductor, the two ends of said spring member being formed to engage said collector bracket, the central portion of said spring member being formed to engage the side of said yoke, and the intermediate portions of said spring member being formed to coil around either end of said shaft in a manner creating a torsion force tending to rotate said collector bracket.

3. In an electrified conveyor system of the type wherein a conveyor track is suspended from a structural member, load carrying conveyor brackets having upper ends forming a yoke are provided with opposed trolley wheels extending inwardly to run along on the upper surface of said conveyor track, and a plurality of parallel electrical conducting members are adjoined to said conveyor track above the upper ends of said conveyor bracket; a power collector assembly attached to the upper end of either side of said yoke comprising a collector shoe positioned to contact one of said conducting members, insulating members for holding said collector shoe, a collector bracket member for mounting said insulating members, a shaft extending longitudinally through an upper end of said yoke, said collector bracket member being articulately journaled on said shaft, a lead wire attached to said collector shoe, and a spring member for urging said collector bracket to rotate inwardly whereby said collector shoe is held in continuous engagement with said conductor, the two ends of said spring member being formed to engage said collector bracket, the central portion of said spring member being formed to engage the side of said yoke, and the intermediate portions of said spring member being formed to coil around either end of said shaft in a manner creating a torsion force tending to rotate said collector bracket, said lead wire passing between the central portion of said spring and the side of said yoke in a manner whereby the torsion force in said spring also serves to hold said lead wire in position.

EDWARD MULLEN.

REFERENCES CITED

The following references are of record in the file of this patent:

UNITED STATES PATENTS

| Number | Name | Date |
| --- | --- | --- |
| 533,772 | Yost | Feb. 5, 1895 |
| 610,007 | Walkins | Aug. 30, 1898 |
| 676,035 | Halberstadt | June 11, 1901 |
| 848,507 | Sullivan | Mar. 26, 1907 |
| 2,306,885 | Klemm et al. | Dec. 29, 1942 |
| 2,443,371 | Barner | June 15, 1948 |